United States Patent [19]
Westerberg

[11] Patent Number: 6,069,345
[45] Date of Patent: May 30, 2000

[54] APPARATUS AND METHOD FOR COOKING FOOD WITH A CONTROLLED SPECTRUM

[75] Inventor: Eugene R. Westerberg, Palo Alto, Calif.

[73] Assignee: Quadlux, Inc., Fremont, Calif.

[21] Appl. No.: 09/215,883

[22] Filed: Dec. 10, 1998

Related U.S. Application Data

[60] Provisional application No. 60/069,096, Dec. 11, 1997.

[51] Int. Cl.[7] .............................. A47J 37/06; A21D 6/00; A21B 1/22; A21B 2/00
[52] U.S. Cl. .......................... 219/411; 219/413; 99/331; 426/243; 426/248
[58] Field of Search .................................. 219/411–413; 392/411; 99/331, 451; 426/243, 248

[56] References Cited

U.S. PATENT DOCUMENTS

| | | | |
|---|---|---|---|
| 4,164,591 | 8/1979 | Ahlgren et al. ............................ | 99/386 |
| 5,036,179 | 7/1991 | Westerberg et al. ...................... | 219/411 |
| 5,382,441 | 1/1995 | Lentz et al. ............................... | 426/241 |
| 5,478,986 | 12/1995 | Westerberg .............................. | 219/411 |

FOREIGN PATENT DOCUMENTS

| | | |
|---|---|---|
| 2546106 | 4/1977 | Germany . |
| 1-235550 | 9/1989 | Japan . |
| 7-49126 | 2/1995 | Japan . |

*Primary Examiner*—Joseph Pelham
*Attorney, Agent, or Firm*—Limbach & Limbach

[57] ABSTRACT

A lightwave oven for cooking with light having wavelengths in the visible, near visible, and infra-red spectral ranges uses one or more quartz halogen tungsten lamps or quartz arc bulbs positioned above and below the food item and delivers light energy in select ranges of the electromagnetic spectrum during select portions of the cooking cycle.

11 Claims, 8 Drawing Sheets

| | |
|---|---|
| BEANS, GREEN | 95.1 |
| BEEF | 72.6 |
| CARROTS | 91.0 |
| CHICKEN (ROASTED) | 47.2 |
| COD FISH | 82.6 |
| CORN ON COB | 76.0 |
| MILK | 87.0 |
| MUSHROOMS | 92.4 |
| PEAS | 82.9 |
| PORK (LEG) | 53.7 |
| RABBIT | 75.0 |
| RHUBARB | 94.8 |
| SALMON | 72.0 |
| SHRIMP | 59.4 |
| SPINACH | 92.1 |
| SWEET POTATOES | 66.7 |
| TUNA | 54.1 |
| TURNIP GREENS | 80.0 |
| VEAL | 75.0 |

FROM PRACTICAL FOOD MICROBIOLOGY AND TECHNOLOGY
—MOUNTNEY & GOULD, 1988

FIG. 9

APPARATUS AND METHOD FOR COOKING FOOD WITH A CONTROLLED SPECTRUM

This application claims the benefit of U.S. Provisional Application No. 60/069,096, file Dec. 11, 1997.

FIELD OF THE INVENTION

This invention relates to the field of lightwave cooking devices. More particularly, this invention relates to lightwave cooking devices having an array of radiation sources and equipped with interference filters for selectively controlling transmission of radiant energy of a specified range of wavelengths.

BACKGROUND OF THE INVENTION

Ovens for cooking and baking food have been known and used for thousands of years. Basically, oven types can be categorized in four cooking forms; conduction cooking, convection cooking, infrared radiation cooking and microwave radiation cooking.

There are subtle differences between cooking and baking. Cooking just requires the heating of the food. Baking of a product from a dough, such as bread, cake, crust, or pastry, requires not only heating of the product throughout but also chemical reactions coupled with driving the water from the dough in a predetermined fashion to achieve the correct consistency of the final product and finally browning the outside. Following a recipe when baking is very important. An attempt to decrease the baking time in a conventional oven by increasing the temperature results in a damaged or destroyed product.

In general, there are problems when one wants to cook or bake foodstuffs with high-quality results in the shortest times. Conduction and convection provide the necessary quality, but both are inherently slow energy transfer methods. Long-wave infrared radiation can provide faster heating rates, but it only heats the surface area of most foodstuffs, leaving the internal heat energy to be transferred by much slower conduction. Microwave radiation heats the foodstuff very quickly in depth, but during baking the loss of water near the surface stops the heating process before any satisfactory browning occurs. Consequently, microwave ovens cannot produce quality baked foodstuffs, such as bread.

Radiant cooking methods can be classified by the manner in which the radiation interacts with the foodstuff molecules. For example, starting with the longest wavelengths for cooking, the microwave region, most of the heating occurs because the radiant energy couples into the bipolar water molecules causing them to rotate. Viscous coupling between water molecules converts this rotational energy into thermal energy, thereby heating the food. Decreasing the wavelength to the long-wave infrared regime, the molecules and their component atoms resonantly absorb the energy in well-defined excitation bands. This is mainly a vibrational energy absorption process. In the shortwave infrared region of the spectrum, the main part of the absorption is due to higher frequency coupling to the vibrational modes. In the visible region, the principal absorption mechanism is excitation of the electrons that couple the atoms to form the molecules. These interactions are easily discerned in the visible band of the spectra, where they are identified as "color" absorptions. Finally, in the ultraviolet, the wavelength is short enough, and the energy of the radiation is sufficient to actually remove the electrons from their component atoms, thereby creating ionized states and breaking chemical bonds. This short wavelength, while it finds uses in sterilization techniques, probably has little use in foodstuff heating, because it promotes adverse chemical reactions and destroys food molecules.

Lightwave ovens are capable of cooking and baking food products in times much shorter than conventional ovens. This cooking speed is attributable to the range of wavelengths and power levels that are used.

There is no precise definition for the visible, near-visible and infrared ranges of wavelengths because the perceptive ranges of each human eye is different. Scientific definitions of the "visible" light range, however, typically encompass the range of about 0.39 $\mu$m to 0.77 $\mu$m. The term "near-visible" has been coined for infrared radiation that has wavelengths longer than the visible range, but less than the water absorption cut-off at approximately 1.4 $\mu$m. The term "infrared" refers to wavelengths greater than approximately 1.4 $\mu$m. For the purposes of this disclosure, the visible region includes wavelengths between about 0.39 $\mu$m and 0.77 $\mu$m, the near-visible region includes wavelengths between about 0.77 $\mu$m and approximately 1.4 $\mu$m, and the infrared region includes wavelengths greater than about 1.4 $\mu$m.

Typically, wavelengths in the visible range (0.39 to 0.77 $\mu$m) and the near-visible range (0.77 to 1.4 $\mu$m) have fairly deep penetration in most foodstuffs. This range of deep penetration is mainly governed by the absorption properties of water. The characteristic penetration distance for water varies from about 50 meters in the visible to less than about 1 mm at about 1.4 microns. Several other factors modify this basic absorption penetration. In the visible region electronic absorption of the food molecules reduces the penetration distance substantially, while scattering in the food product can be a strong factor throughout the region of deep penetration. Measurements show that the typical average penetration distances for light in the visible and near-visible region of the spectrum varies from 2–4 mm for meats to as deep as 10 mm in some baked goods and liquids like non-fat milk.

The region of deep penetration allows the radiant power density that impinges on the food to be increased, because the energy is deposited in a fairly thick region near the surface of the food, and the energy is essentially deposited in a large volume, so that the temperature of the food at the surface does not increase rapidly. Consequently the radiation in the visible and near-visible regions does not contribute greatly to the exterior surface browning.

In the region above approximately 1.4 $\mu$m (infrared region), the penetration distance decreases substantially to fractions of a millimeter, and for certain absorption peaks down to 0.001 mm. The power in this region is absorbed in such a small depth that the temperature rises rapidly, driving the water out and forming a crust. With no water to evaporate and cool the surface the temperature can climb quickly to 300° F. This is the approximate temperature where the set of browning reactions (Maillard reactions) are initiated. As the temperature is rapidly pushed even higher to above 400° F. the point is reached where the surface starts to burn.

It is the balance between the deep penetration wavelengths (0.39 to 1.4 $\mu$m) and the shallow penetration wavelengths (about 1.4 $\mu$m and greater) that allows the power density at the surface of the food to be increased in the lightwave oven, to cook the food rapidly with the shorter wavelengths and to brown the food with the longer infrared so that a high-quality product is produced. Conventional ovens do not have the shorter wavelength components of radiant energy. The resulting shallower penetration means that increasing the radiant power in such an oven only heats the food surface faster, prematurely browning the food before its interior gets hot.

It should be noted that the penetration depth is not uniform across the deeply penetrating region of the spectrum. Even though water shows a very deep penetration for visible radiation, i.e., many meters, the electronic absorptions of the food macromolecules generally increase in the visible region. The added effect of scattering near the blue end (0.39 μm) of the visible region reduces the penetration even further. However, there is little real loss in the overall average penetration because very little energy resides in the blue end of the blackbody spectrum.

Conventional ovens operate with radiant power densities as high as about 0.3 W/cm$^2$ (i.e. at 400° F.). The cooking speeds of conventional ovens cannot be appreciably increased simply by increasing the cooking temperature, because increased cooking temperatures drive water off the food surface and cause browning and searing of the food surface before the food's interior has been brought up to the proper temperature. In contrast, lightwave ovens have been operated from approximately 0.8 to 5 W/cm$^2$ of visible, near-visible and infrared radiation, which results in greatly enhanced cooking speeds. The lightwave oven energy penetrates deeper into the food than the radiant energy of a conventional oven, thus cooking the food interior faster. Therefore, higher power densities can be used in a lightwave oven to cook food faster with excellent quality. For example, at about 0.7 to 1.3 W/cm$^2$, the following cooking speeds have been obtained using a lightwave oven:

Food Cook Time pizza 4 minutes steaks 4 minutes biscuits 7 minutes cookies 11 minutes vegetables (asparagus) 4 minutes For high-quality lightwave cooking and baking, the applicants have found that a good balance ratio between the deeply penetrating and the surface heating portions of the impinging radiant energy is about 50:50, i.e., Power (0.39 to 1.4 μm)/Power(1.4 μm and greater)~1. Ratios higher than this value can be used, and are useful in cooking especially thick food items, but radiation sources with these high ratios are difficult and expensive to obtain. Fast cooking can be accomplished with a ratio substantially below 1, and it has been shown that enhanced cooking and baking can be achieved with ratios down to about 0.5 for most foods, and lower for thin foods, e.g., pizza and foods with a large portion of water, e.g., meats. Generally the surface power densities must be decreased with decreasing power ratio so that the slower speed of heat conduction can heat the interior of the food before the outside burns. It should be remembered that it is generally the burning of the outside surface that sets the bounds for maximum power density that can be used for cooking. If the power ratio is reduced below about 0.3, the power densities that can be used are comparable with conventional cooking and no speed advantage results.

If blackbody sources are used to supply the radiant power, the power ratio can be translated into effective color temperatures, peak intensities, and visible component percentages. For example, to obtain a power ratio of about 1, it can be calculated that the corresponding blackbody would have a temperature of 3000° K., with a peak intensity at 0.966 μm and with 12% of the radiation in the full visible range of 0.39 to 0.77 μm. Tungsten halogen quartz bulbs have spectral characteristics that follow the blackbody radiation curves fairly closely. Commercially available tungsten halogen bulbs have successfully been used with color temperatures as high as 3400° K. Unfortunately, the lifetime of such sources falls dramatically at high color temperatures (at temperatures above 3200° K. it is generally less that 100 hours). It has been determined that a good compromise in bulb lifetime and cooking speed can be obtained for tungsten halogen bulbs operated at about 2900–3000° K. As the color temperature of the bulb is reduced and more shallow-penetrating infrared is produced, the cooking and baking speeds are diminished for quality product. For most foods there is a discernible speed advantage down to about 2500° K. (peak at about 1.2 μm; visible component of about 5.5%) and for some foods there is an advantage at even lower color temperatures. In the region of 2100° K. the speed advantage vanishes for virtually all foods that have been tried.

Lightwave ovens can use a plurality of these lamps or an array of several lamps either operated in unison or selectively operated in varying combinations as necessary for the particular food item sought to be cooked. These radiation sources are ordinarily positioned above and below the food item. The walls of the surrounding food chamber are preferably made from highly reflective surfaces. The visible and infrared waves from the radiation sources impinge directly on the food item and are also reflected off the reflected surfaces and onto the food item from many angles. This reflecting action improves uniformity of cooking.

For rectangular-shaped commercial lightwave ovens using polished, highpurity aluminum reflective walls, it has been determined that about 4 kilowatts of lamp power is necessary for a lightwave oven to have a reasonable cooking speed advantage over a conventional oven. Four kilowatts of lamp power can operate four commercially available tungsten halogen lamps, at a color temperature of about 3000° K., to produce a power density of about 0.6–1.0 W/cm$^2$ inside the oven cavity. This power density has been considered near the minimum value necessary for the lightwave oven to clearly outperform a conventional oven. Such commercial lightwave ovens can have lamps both above and below the cooking surface so that the foodstuff on the cooking surface is cooked relatively evenly. A lightwave oven of this type is described in PCT/US92/06266, filed Jul. 29, 1992, entitled COOKING APPARATUS USING ELECTRON AND MOLECULAR EXCITATION MODE, which is incorporated herein by reference.

A high efficiency lightwave oven has also been developed and is described in PCT/US98/18472, "LIGHTWAVE OVEN AND METHOD OF COOKING THEREWITH HAVING MULTIPLE COOK MODES AND SEQUENTIAL LAMP OPERATION" and PCT/US98/18861, "HIGH EFFICIENCY LIGHTWAVE OVEN", each of which was filed Sep. 4, 1998 and is incorporated by reference for all purposes. Such an oven can be utilized as a kitchen countertop lightwave oven and can be operated using a standard 120 VAC electrical outlet. This high efficiency lightwave oven can achieve a uniform time-average power density of about 0.7 W/cm$^2$ in a lightwave oven cavity using only two 1.0 KW, 120 VAC tungsten halogen quartz bulbs consuming about 1.8 KW of power at any one time and operating at a color temperature of about 2900° K. The dramatic increase in power density is attained by making a relatively small change in the reflectivity of the oven wall materials, and by changing the geometry of the oven to provide a novel reflecting cavity. Uniform cooking of foodstuffs is achieved by using novel reflectors adjacent to the lamps.

In certain lightwave cooking applications, the time period during which a food item must be exposed to a certain spectral range of radiation energy for optimal cooking may not equal the amount of time during which the food item should be exposed to a different spectral range. For example, when radiation in the visible, near-visible, and infrared regions of the electromagnetic spectrum are used for cooking thick or deep food items such as baked goods, the infrared radiation will sometimes brown the exterior of the food item before the visible and near-visible radiation has had sufficient time to penetrate and cook the deep regions of the food item. This browned exterior can necessitate premature removal of the food item from the cooking apparatus in order to prevent the exterior of the food item from browning and will therefore yield a product having a satisfactorily cooked exterior and an undercooked interior. Moreover, the formation of a dark crust on the exterior of the food item by action of the infra-red radiation will impede passage of the visible and near-visible radiation into the interior regions of the food item and may thus prevent the interior region from being cooked before the finished crust necessitates termination of the cooking cycle.

As can be understood in view of the above example, lightwave cooking applications can be further improved by creating specified cooking cycles in which spectrally-controlled radiant energy is selectively delivered to a food item sought to be cooked.

OBJECTS AND SUMMARY OF THE INVENTION

It is an object of the present invention to provide a method and apparatus for lightwave cooking which selectively directs radiant energy having a controlled spectrum onto a food item depending on the nature of the food item sought to be cooked. It is a further object of the present invention to provide an energy efficient apparatus and method for delivering select combinations of visible, near-visible, and infra-red radiation to a food item depending on the nature of the food item sought to be cooked.

The present invention utilizes an array of light sources capable of selectively delivering radiant energy having various combinations of spectral ranges within the visible, near-visible, and infra-red regions of the electromagnetic spectrum. Selected spectral combinations of radiant energy are impinged on a food item during appropriate portions of a lightwave cooking cycle.

DETAILED DESCRIPTION

The present invention is comprised generally of an oven 10, upper and lower arrays 12, 14 of radiant energy sources, or lamps 16a, 16b, 18a, 18b (FIG. 2) positioned to impinge radiant energy on a food item AA positioned inside the oven.

Figure 1:
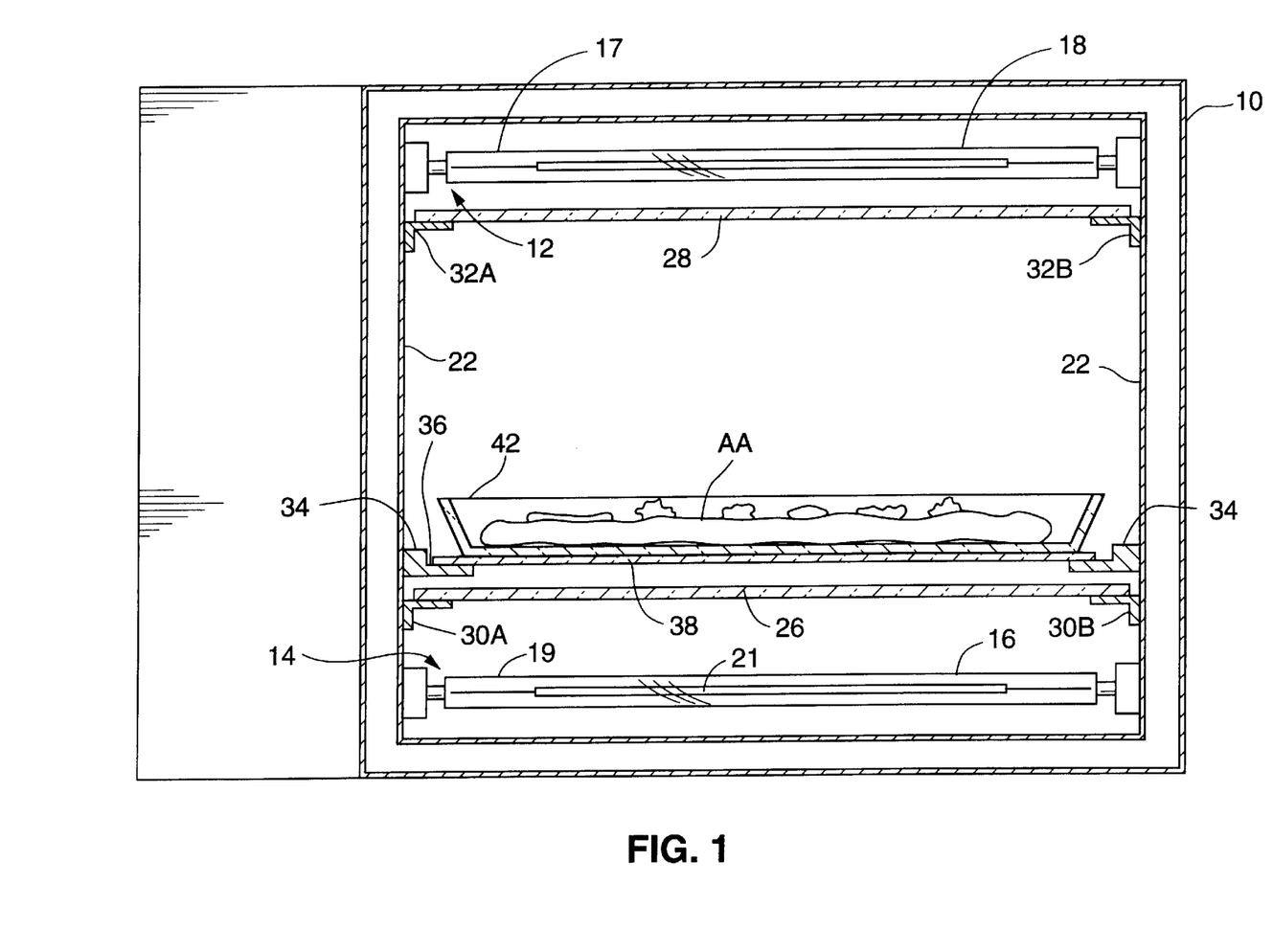
FIG. 1 is a front section view of an oven according to the present invention.

FIG. 1 is a front section view of the oven. The energy for cooking is supplied by lower lamps 16a, 16b and upper lamps 18a, 18b.

The inner surface of the inner wall 22 is preferably a highly reflective material such as a polished metal, such as Alanod aluminum or silver, or another form of diffuse or specular material which is very reflective to the wide spectrum of wavelengths from the radiant lamps. The oven has a door 24 (FIG. 2) which also has a reflective inner surface.

Two radiation transparent plates 26 and 28 are used to isolate the cooking chamber from the radiant lamps, making the oven easier to clean. These plates can be formed from materials, such as high quality heat-resistant glasses and pyroceramic materials that are transparent to visible, non-visible and infrared radiations. The lower transparent plate 26 is supported by brackets 30a and 30b and is positioned above the lower lamp array 14. The upper transparent plate 28 is supported by brackets 32a and 32b and is positioned below upper lamp array 12.

Shelf 34 is mounted between the transparent plates 26, 28 inside the oven chamber. The shelf 34 may include a circular cut out portion 36 formed to support a circular wire rack 38. During use, a heat-resistant glass or pyroceramic dish 42 which holds the food AA is placed on top of the rack for cooking. The rack 38 may be made to rotate by motor driven rollers (not shown) mounted to the shelf 34.

The lamps are preferably quartz-halogen tungsten lamps or quartz-arc lamps which (when unfiltered) produce light energy that includes energy in the visible and near visible light spectrum. There is no precise definition for the range of wavelengths for visible light because the perceptive ranges of each human eye is different. Scientific definitions typically encompass the range of 0.39 $\mu$m to 0.77 $\mu$m. An engineering shorthand for visible light specifies the range of 0.4 $\mu$m to 0.7 $\mu$m. The term near-visible has been coined for radiation that has wavelengths longer than the visible range, but less than the water absorption cut-off at about 1.4 $\mu$m. Although quartz-halogen, quartz-arc or similar lamps are preferred for their efficiency in lightwave cooking applications, any other lamps which emit radiant energy in this range may also be used without departing from the scope of the invention.

The radiant energy emitted by the lamps is controlled by spectrum. In other words, cooking with the oven of the present invention may be carried out using radiant energy lying within one or more select portions of the electromagnetic spectrum. For example, it may be desirable to use visible and near-visible radiation throughout a cooking cycle so that the food is cooked throughout its inner regions, and to use infrared radiation only at the end of the cooking cycle in order to brown the food item.

Figure 9:
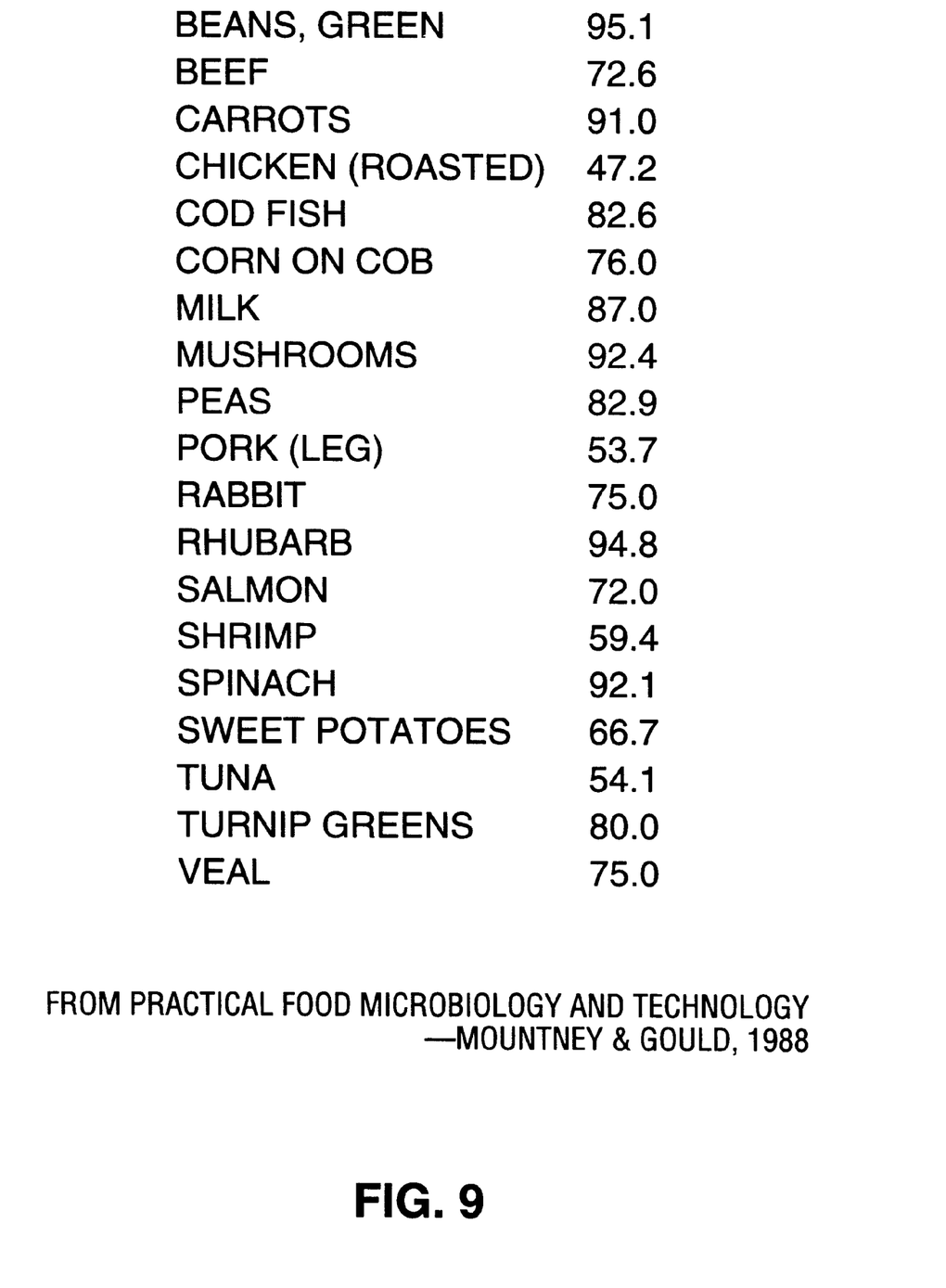
FIG. 9 is a table giving the percentage of water in various foodstuffs.

Most foods have a high percentage of water in their compositions. As shown in the table of FIG. 9, most common foodstuffs contain more than 50% water. Because of this, the absorption characteristics of water predominate the spectral absorption in food.

Figure 3:
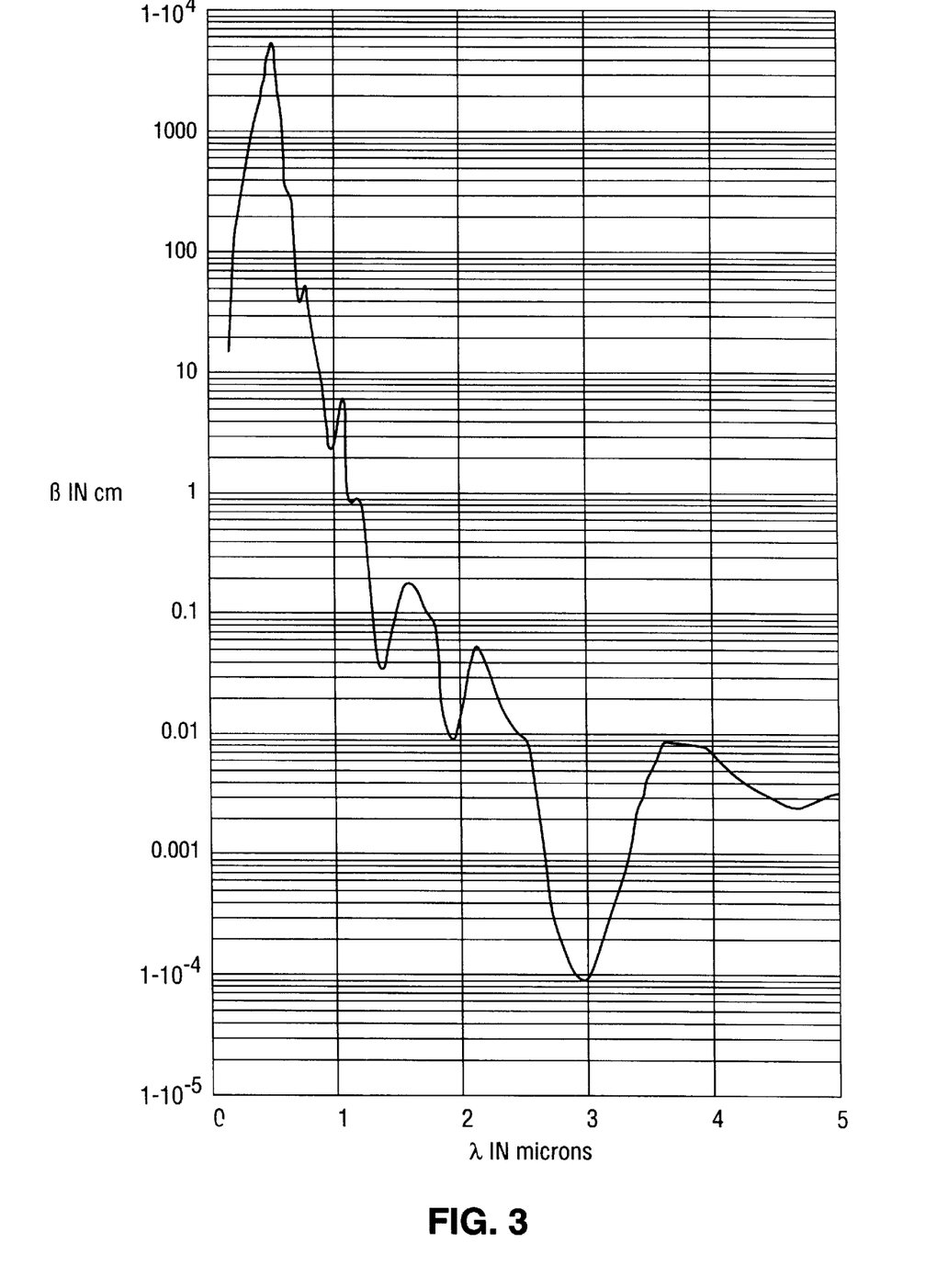
FIG. 3 is a plot of the depth of radiant energy absorption in water as a function of wavelength.

FIG. 3 depicts the depth of absorption of water as a function of wavelength from 0.3 to 5 $\mu$m. Note that the absorption depth varies by almost eight orders of magnitude over this range. In the longer infrared range the penetration is only a few μm, while in the middle of the visible range it is over ten meters. This extreme variation divides the spectrum naturally into two regions. Since most food thicknesses are of the order of a few centimeters, deep penetration on the order of a centimeter occurs for radiant wavelengths shorter than about 1.4 μm. The additional scattering of the light by structures in the food modifies the depth of penetration, but 1.4 μm remains an approximate delineating wavelength between "deep-penetrating" and "shallow-penetrating" regions.

Deep penetration of radiant energy to depths of a few centimeters or more allows very high intensities to be used to heat foodstuffs fast without burning, because low energy densities are actually absorbed in the food. On the other hand the shallow-penetration of the radiation above 1.4 μm implies high energy densities, and therefore provides the higher temperatures necessary for food browning. For effective black-body radiators such as tungsten halogen bulbs operating for example at a color temperature of 3000° K., this means that the energy distribution is split approximately evenly between deep-penetrating radiation and shallow-penetrating radiation. In effect it is the presence of the shallow-penetrating radiation that limits the amount of power, i.e., the intensity, that can be applied to foodstuffs, because the shorter penetration of the longer wavelengths leads to premature browning and eventually burning of the food surface.

If the spectrum emitted from the lamps can be controlled so that the lamps can be constructed to provide two or more separate types of radiant spectrums, then it becomes possible to control the deep-heating rate and the browning rate independently. One type of lamp would have a spectrum which consists primarily of deep penetration radiation, such as from 0.4 to 1.4 μm, and the other lamp might have a spectrum with radiation mainly at wavelengths longer than 1.4 μm. It should be noted that the deep penetrating lamp may alternatively be configured to emit any subset of wavelengths within this range. However, emitting energy across the range of 0.4–1.4 microns will achieve higher efficiency cooking.

Figure 4:
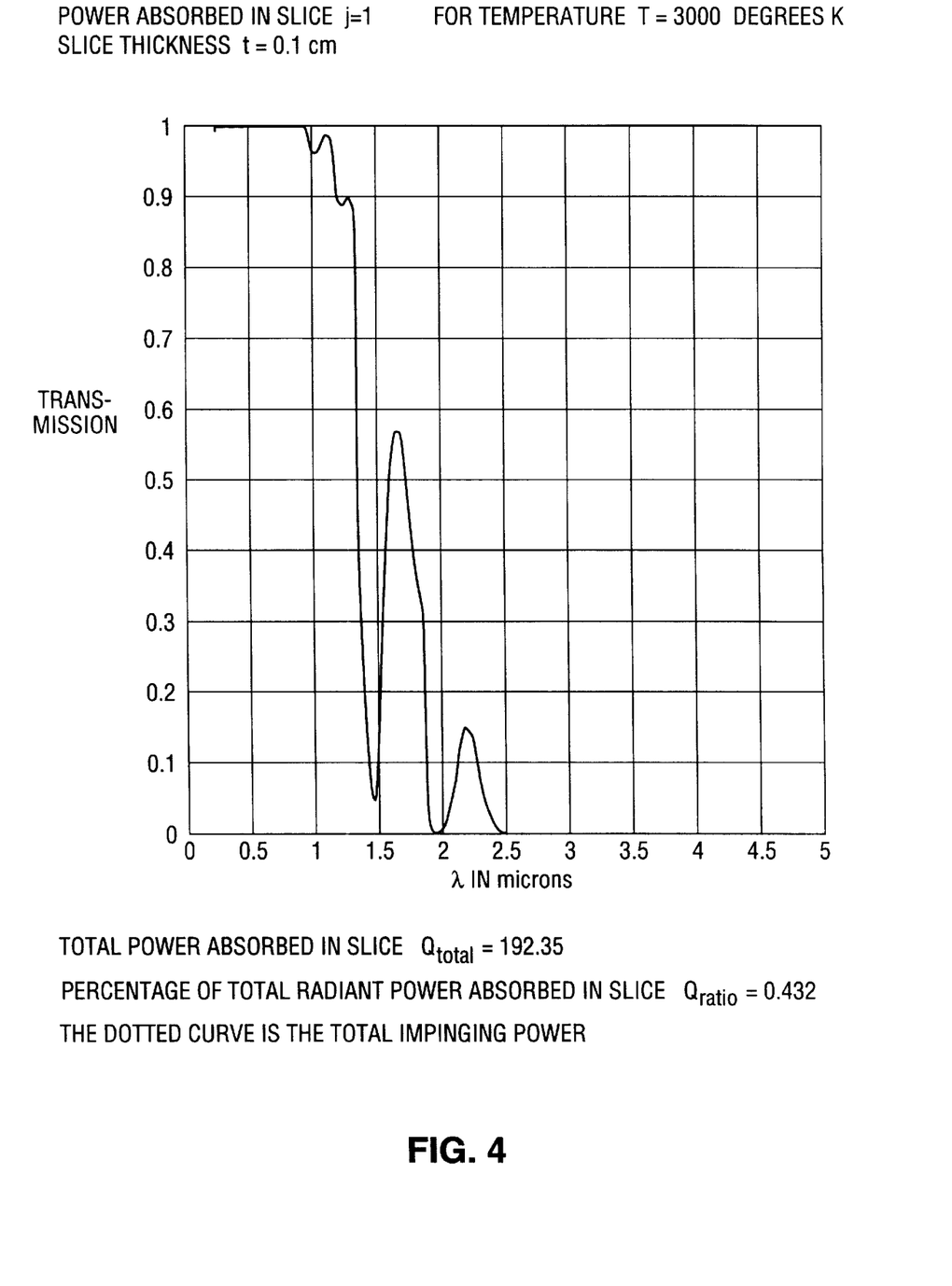
FIG. 4 is a plot of the filter characteristics of a 1 cm thickness of water.

Using filters filled with water to approximate the first type of lamp, the filter characteristics of a 1 cm thick stream of water was determined and is shown in FIG. 4. Using such filters, experiments were carried out using foods that are very sensitive to browning (such as par-baked breadsticks). These experiments demonstrated that food that normally browns in approximately 1 minute with the radiation from a normal tungsten halogen bulb can be heated for over eight minutes with water-filtered radiation of the same intensity until most of the water in the breadstick has been removed with little browning. Numerous other means for delivering select wavelengths of energy may also be configured in accordance with the present invention. For example, gaseous discharge lamps, such as krypton argon lamps, are capable of delivering controlled varying spectra of radiant energy. Similarly, it can also be envisioned that laser energy having specified wavelengths can also be delivered to the food item in accordance with the present invention. Moreover, water vapor surrounding the food item during cooking may be used to impede access by the infrared portion of the radiant energy to the food surface, and can thereby be used to slow the browning process. After the interior regions of the food have been adequately cooked, the water vapor may be drawn out of the oven by an exhaust system, thereby permitting the infrared radiation to reach, and therefore brown, the food surface. The spectrum of the radiant energy emitted by the lamps may also be adjusted by increasing and/or decreasing the power to the lamps.

Figure 5:
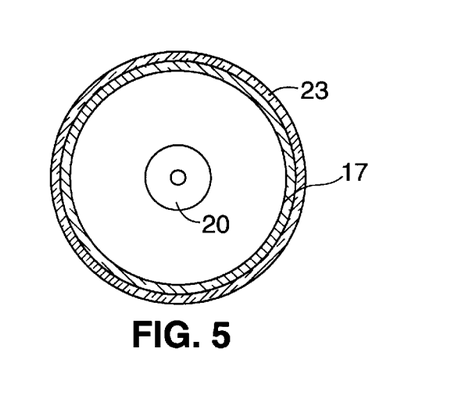
FIG. 5 is a side section view of a filtered lamp in accordance with the preferred embodiment of the present invention.

In the preferred apparatus, radiation lying within certain portions of the electromagnetic spectrum is blocked by thin films, called interference filters and designated 23 in FIG. 5. As shown in FIG. 5, Each lamp is comprised of a quartz envelope 17 surrounding a conductive filament 20. The interference filters are adhered to the quartz envelopes of each lamp for which the spectrum is desired to be controlled. The lamps are preferably configured such that, during different portions of the cooking cycle, lamps that are filtered to deliver the desired spectral frequency will be illuminated while the others will remain in an off state. The interference filters may alternatively be the transparent glass or pyroceramic plates 26, 28 or other filtering devices positioned in the oven between the lamps and the food position.

Film materials are chosen by their indices of refraction depending on the wavelengths of radiant energy sought to be eliminated from the radiant energy emitted from a particular lamp. Materials having different indices of refraction may be overlaid so as to make an interference filter capable of transmitting specified windows of spectral wavelengths. For example, films of silicon dioxide, which has an index of refraction of 1.45, and tantalum oxide, which has an index of refraction of 2.35 can be alternated to produce an interference filter that has a transparent window of between 0.45 and 1.4 μm and that blocks radiation above 1.4 μm by reflecting it back onto the lamp filament.

In addition to their primary function of allowing only radiant energy of a desired spectrum to impinge upon a food item during a specified portion of a cooking cycle, the interference filters serve the secondary function of improving the energy efficiency of the cooking apparatus. Because of the cylindrical geometry of the lamp, the blocked component of the radiant energy is reflected back to the filament where it is useful for heating the filament and thereby for reducing the amount of electrical energy required to heat the filament.

Figure 6:
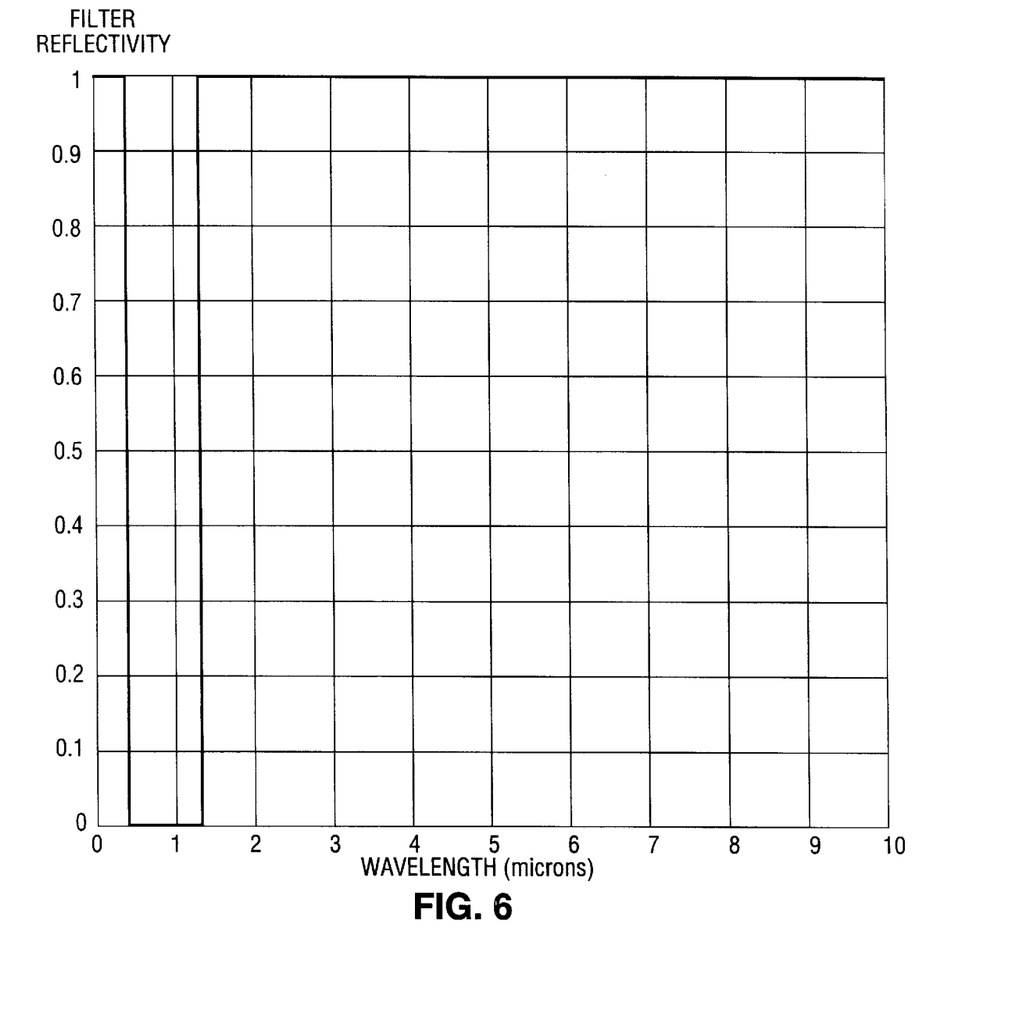
FIG. 6 is a graph showing the preferred filter characteristics for high penetration cooking.

FIG. 6 is a plot of filter reflectivity versus wavelength showing the preferred filter characteristics for high penetration cooking. For high penetration (or "deep") cooking, wavelengths in the visible and near-visible regions of the electromagnetic spectrum are needed. Thus, the filter reflectivity in the range of approximately 0.4 μm to 1.4 μm is preferably approximately zero (i.e. highly transmissive), which the filter reflectivity in the remaining portions of the spectrum is preferably approximately 1 (i.e. poorly transmissive). In other words, a preferred lamp for deep cooking impinges only radiant energy falling within the range of approximately 0.4 μm to 1.4 μm. The radiant energy in the infrared region is blocked out in order to prevent surface browning which can impede passage of the visible and near-visible radiation into the food item.

Figure 7:
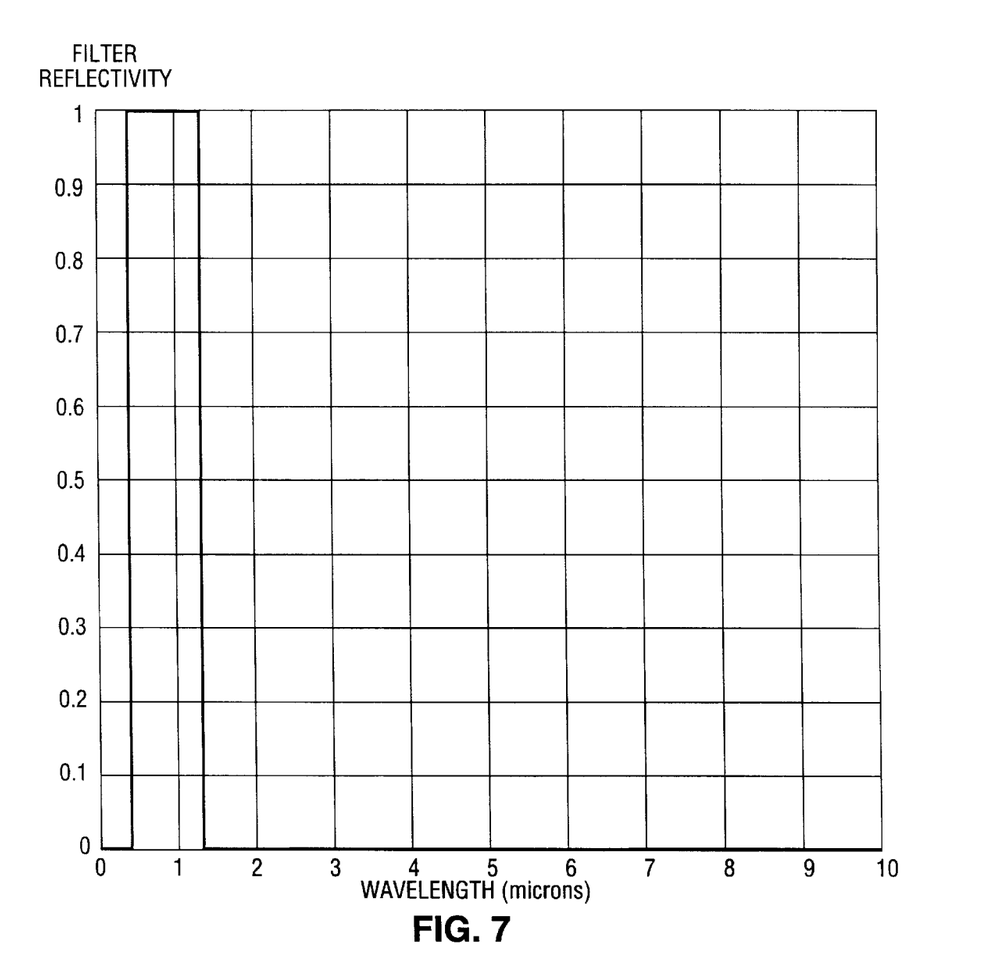
FIG. 7 is a graph showing the preferred filter characteristics for surface browning.
Figure 8:
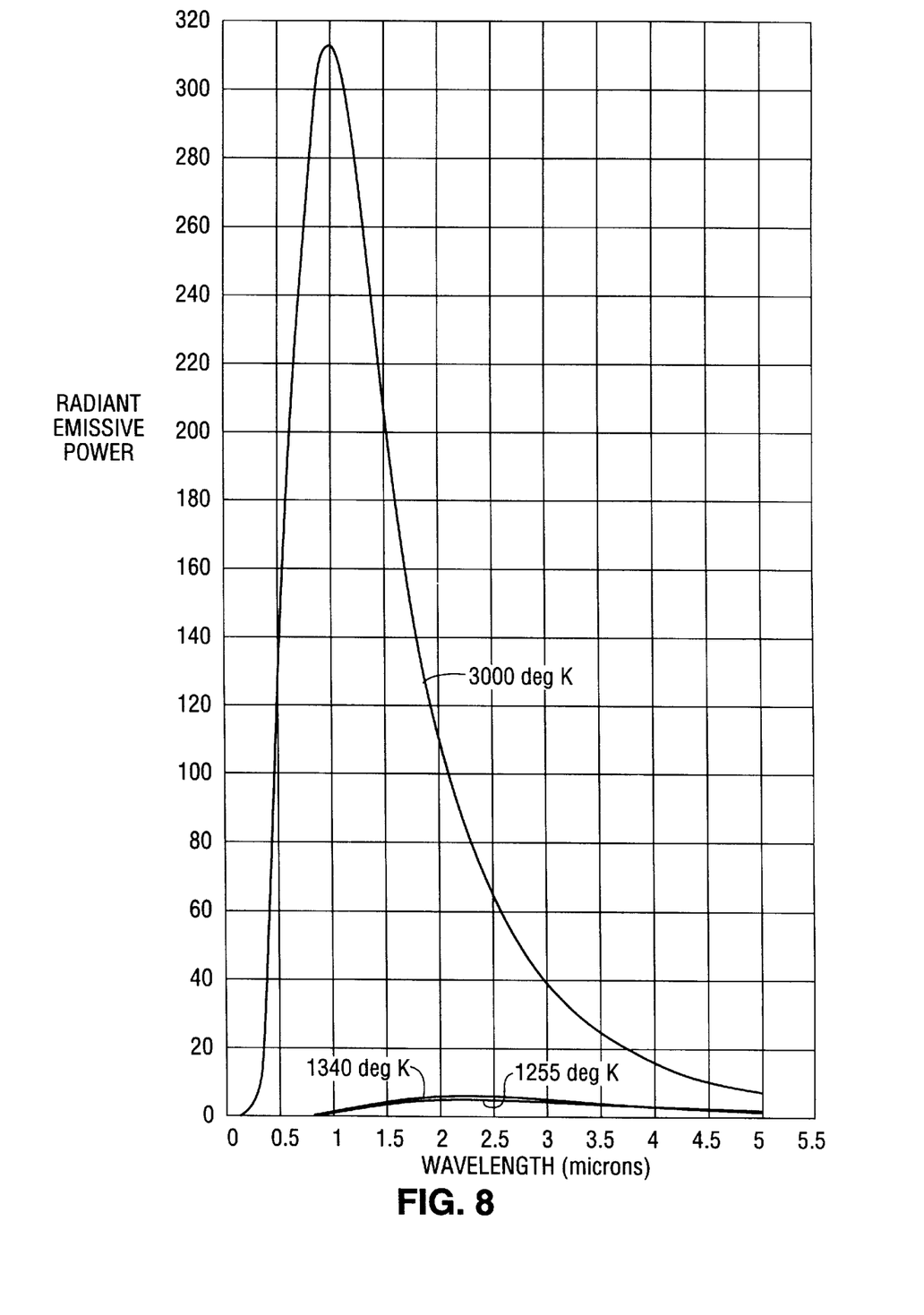
FIG. 8 shows black body radiation curves for radiators having surface temperatures of 3000° K., 1340° K., and 1255° K.

FIG. 7 shows a plot of the preferred filter characteristics for surface browning. As can be seen, a preferred lamp for surface browning has zero filter reflectivity in the infrared region of the electromagnetic spectrum.

The use of two different types of lamps for cooking allows one to have independent control of the deep-heating and the browning processes. The result is a very flexible cooking apparatus in which the relative portions of deep-heating and browning can be obtained for any particular food so that optimally cooked interiors and exteriors can be attained independently—a flexibility unobtainable with other cooking means.

Figure 2:
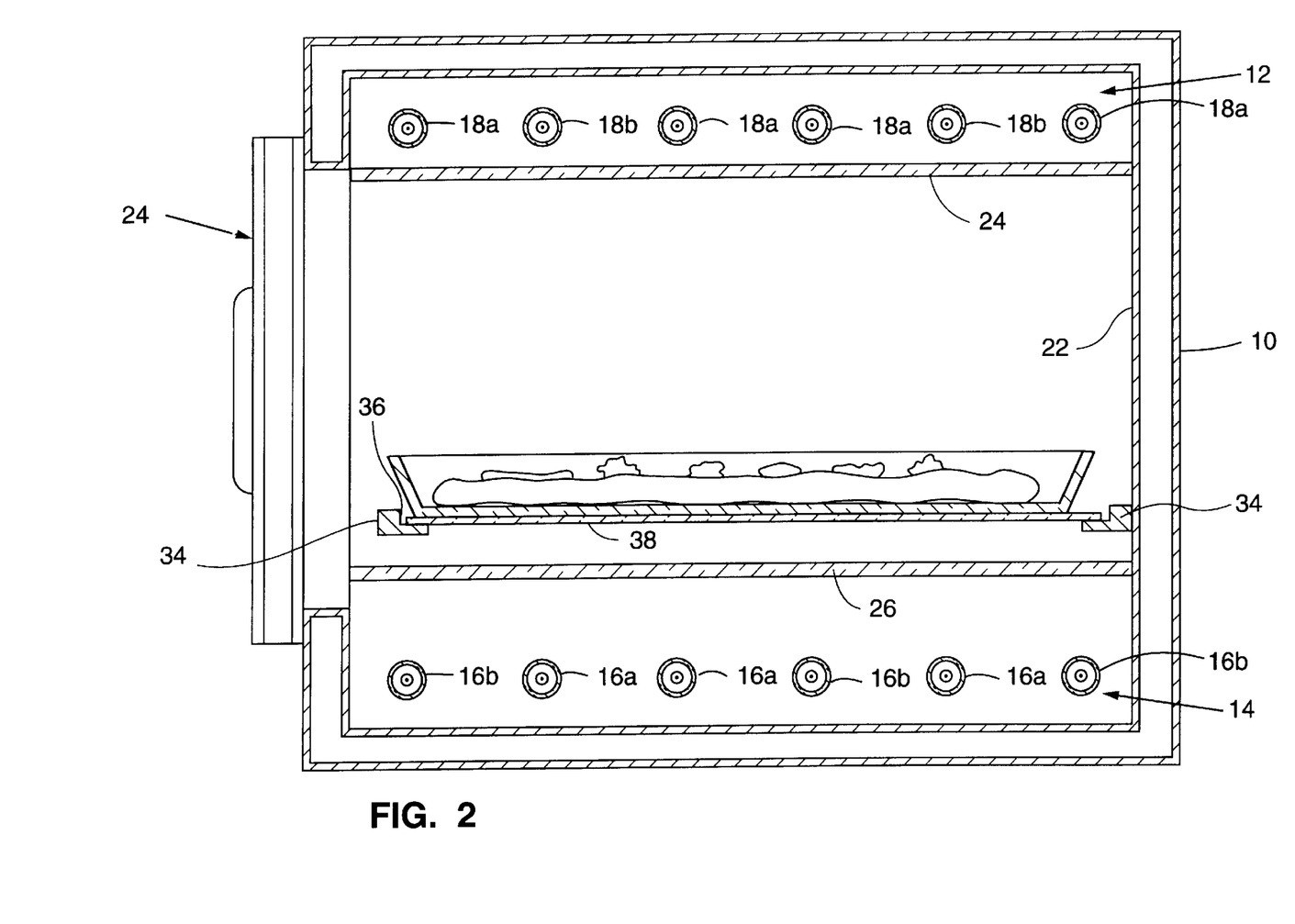
FIG. 2 is a side section view of a preferred embodiment of an oven according to the present invention.

The interference filter arrangements described with respect to the preferred embodiment may be configured in ways which optimize a variety of different cooking applications. Four such applications are described as examples below. For the purposes of these examples, lamps denoted $L_1$ are lamps filtered in accordance with FIG. 6, while L2 lamps are those which are filtered in accordance with the plot of FIG. 7. The L2 lamps may alternatively be unfiltered. In the preferred oven with a total of 12 lamps (8 of which can be turned on at once), eight lamps are L1 lamps, while the remaining four lamps are L2. These lamps are best arranged with 6 lamps in a group above the food and 6 lamps below. Each of these groups has 4 L1 lamps and 2 L2 lamps in a symmetrical arrangement to achieve uniformity of illumination. In FIG. 2, the lamps 16a, 18a are L1 lamps, and the lamps 16b, 18b are L2 lamps.

EXAMPLE 1—DEEP COOKING

For deep cooking, it is desirable to avoid the browning effects of energy in the infrared regions of the electromagnetic spectrum, since a browned surface will absorb energy and therefore prevent the deeply-penetrating visible and near-visible energy from reaching the inner regions of the food item. Thus, a deep cooking operation may be carried out by only illuminating the eight L1 lamps, while the L2 lamps remain in an off state. The lamps may be cycled between higher and lower power levels to facilitate the driving of water molecules out of the food item, as more thoroughly described in U.S. Pat. No. 5,665,259, which is hereby incorporated by reference.

As a further variation on the deep cooking example, the deep cooking operation may be followed by a browning operation, in which all or a portion of the L2 lamps are illuminated after the deep cooking operation. In addition, the L2 lamps may be turned on after the L1 lamps have been on for a period of time, and the L1 and L2 (or a portion thereof) allowed to run simultaneously. The L2 lamps would preferably be turned on at time which would allow browning to be carried out in the amount of time remaining to complete the deep cooking. For sequential or partially overlapping operation, illumination of the L2 lamps may be triggered by direct feedback as to the progress of the deep penetration cooking. By way of example only, such feedback may be obtained from a temperature sensor which measures the food temperature (which will rise as deep cooking progresses) or from a water vapor sensor which monitors water leaving the food surface (the amount of which will decrease after much of the water from within the food has migrated to and then evaporated from the food surface) or from direct visual observation by the person operating the oven (who may, for example, watch for the spreading of cookies or the rising of biscuits). Alternatively, the oven may be programmed with recipes that will initiate the browning cycle after a predetermined period of time determined empirically for certain foods or food types. As a further alternative, the L1 and L2 lamps (or a portion thereof) may be operated simultaneously throughout the cooking process. As can be seen from this example and the others that follow, the apparatus and method for cooking with a controlled spectrum that are described herein allow faster lightwave cooking without loss of control, in that higher cooking energy may be imparted to the food during the deep penetration cooking steps without causing burning of the food surfaces.

EXAMPLE 2—BROWNING

As stated, browning is caused primarily by radiant energy falling in the infrared region of the electromagnetic spectrum. This may be carried out by illuminating the four L2 lamps, and by illuminating four of the L1 lamps. To produce only surface browning this may be carried out by illuminating only the four L2 lamps. If total food cooking is desired with simultaneous browning and deep heating the four L1 lamps or some portion can also be illuminated. Alternatively, the oven may be fitted with eight L2 lamps, in which case all eight L2 lamps would be illuminated during browning.

EXAMPLE 3—FORMING A CRUST

For the purposes of the present description, a "crust" is intended to mean a dried out, hardened, region of the food. This is in contrast to a browned or darkened crust which, as described above, will impede passage of the visible and near-visible ration into the interior regions of the food item.

To form a crust, it is first necessary to drive water from the regions of the food that are near the surface. Radiant energy in the visible and near-visible light range of the electromagnetic spectrum can drive water from the deep regions of the food item out to the food surface. To do this, all eight L1 lamps are illuminated for a time T1 needed to drive water from the surface of the food item and from the regions lying immediately below the surface. The time T1 may be empirically determined for the type of food item desired to be cooked.

Next, the four L2 lamps are illuminated for time T1 in order to brown the crust, if desired.

EXAMPLE 4—DEFROSTING

To defrost a food item, all eight of the L1 are illuminated for a period of time T2, which is the amount of time needed to melt the frozen water within the food item and to drive that water to the surface of the food item. After time T2 has elapsed, the four L2 lamps are illuminated to cause the water to evaporate from the food surface. If it is desired to maintain the oven at a constant power output, four of the L1 lamps may be turned off when the L2 lamps are illuminated.

The present invention has been described in terms of the preferred embodiment and the above examples, but is limited only in terms of the language of the appended claims.

What is claimed is:

1. A method of cooking using radiant energy having a controlled spectrum, comprising the steps of:
    (a) placing a food item into an oven chamber having at least one cooking lamp therein;
    (b) using the cooking lamp, generating radiant energy having components in the infrared, visible and near-visible regions of the electromagnetic spectrum;
    (c) cooking deep portions of the food item by selectively impinging a portion of the visible and near-visible component of the radiant energy onto a food item; and
    (d) after at least partially cooking deep portions of the food item, cooking shallow portions of the food item by selectively impinging a portion of the infra-red component of the radiant energy onto the food item.

2. The method of claim 1 wherein:
    step (b) further comprises the steps of:
        (i) filtering at least a portion of the infrared component out of the radiant energy to produce a deep-cooking component of the radiant energy; and
        (ii) selectively delivering the deep-cooking component to a food item; and
    step (c) further comprises the steps of:
        (i) filtering at least a portion of the visible and near-visible component out of the radiant energy to produce a shallow-cooking component of the radiant energy; and (ii) selectively delivering the shallow-cooking component to the food item.

3. The method of claim 2 wherein step (b) further comprises the step of reflecting at least a portion of the filtered infrared component towards a source of the radiant energy.

4. The method of claim 3 wherein step (b) further comprises the step of heating the source of the radiant energy with the reflected portion of the infrared component to improve the energy efficiency of the light source.

5. The method of claim 2 wherein step (c) further comprises the step of reflecting at least a portion of the filtered visible and near-visible component towards a source of the radiant energy.

6. The method of claim 5 wherein step (c) further comprises the step of heating the source of the radiant energy with the reflected portion of the visible and near-visible component to improve the energy efficiency of the light source.

7. The method of claim 2 further comprising the steps of:
  filtering at least a portion of the visible and near-visible component out of the radiant energy to produce a browning component of the radiant energy; and
  browning the exterior by delivering the browning component to the food item.

8. A method of defrosting using radiant energy having a controlled spectrum, the method comprising the steps of:
  (a) generating radiant energy having components in the infrared, visible, and near-visible regions of the electromagnetic spectrum;
  (b) filtering at least a portion of the infra-red component out of the radiant energy to produce a deep penetrating visible and/or near-visible component of the radiant energy;
  (c) delivering the deep penetrating visible and/or near visible component to a substantially frozen food item to substantially defrost the food item.

9. An apparatus for cooking using radiant energy having a controlled spectrum, the apparatus comprising:
  at least one lamp for generating radiant energy having components in the infrared, visible, and near-visible regions of the electromagnetic spectrum;
  first delivery means for selectively delivering a portion of the radiant energy having wavelengths in the visible and near-visible region of the electromagnetic spectrum to a food item for cooking deep regions of the food item; and
  second delivery means for selectively delivering a portion of the radiant energy having wavelengths in the infra-red region of the electromagnetic spectrum to the food item for cooking shallow regions of the food item, the first and second delivery means operable to initiate cooking of deep regions of the food item prior to the cooking of shallow regions of the food item.

10. The apparatus of claim 9 wherein the first delivery means comprises a filter positioned for receiving radiant energy from the at least one lamp wherein the filter is capable of reflecting a portion of the radiant energy having wavelengths in the infrared region of the electromagnetic spectrum towards the lamp and wherein the filter is substantially transparent to the radiant energy in the visible region of the electromagnetic spectrum.

11. The apparatus of claim 9 wherein the second delivery means comprises a filter positioned for receiving radiant energy from the at least one lamp wherein the filter is capable of reflecting a portion of the radiant energy having wavelengths in the visible region of the electromagnetic spectrum towards the lamp and wherein the filter is substantially transparent to the radiant energy in the infrared region of the electromagnetic spectrum.

* * * * *